C. J. EMBREE.
SEAT AND CARRIER FOR MOTOR CYCLES.
APPLICATION FILED AUG. 8, 1910.
1,020,486.
Patented Mar. 19, 1912.
2 SHEETS—SHEET 1.
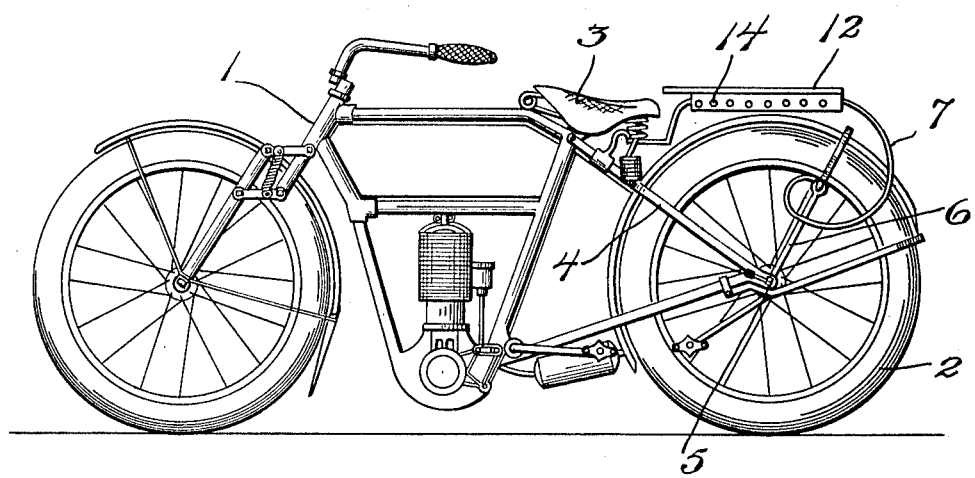

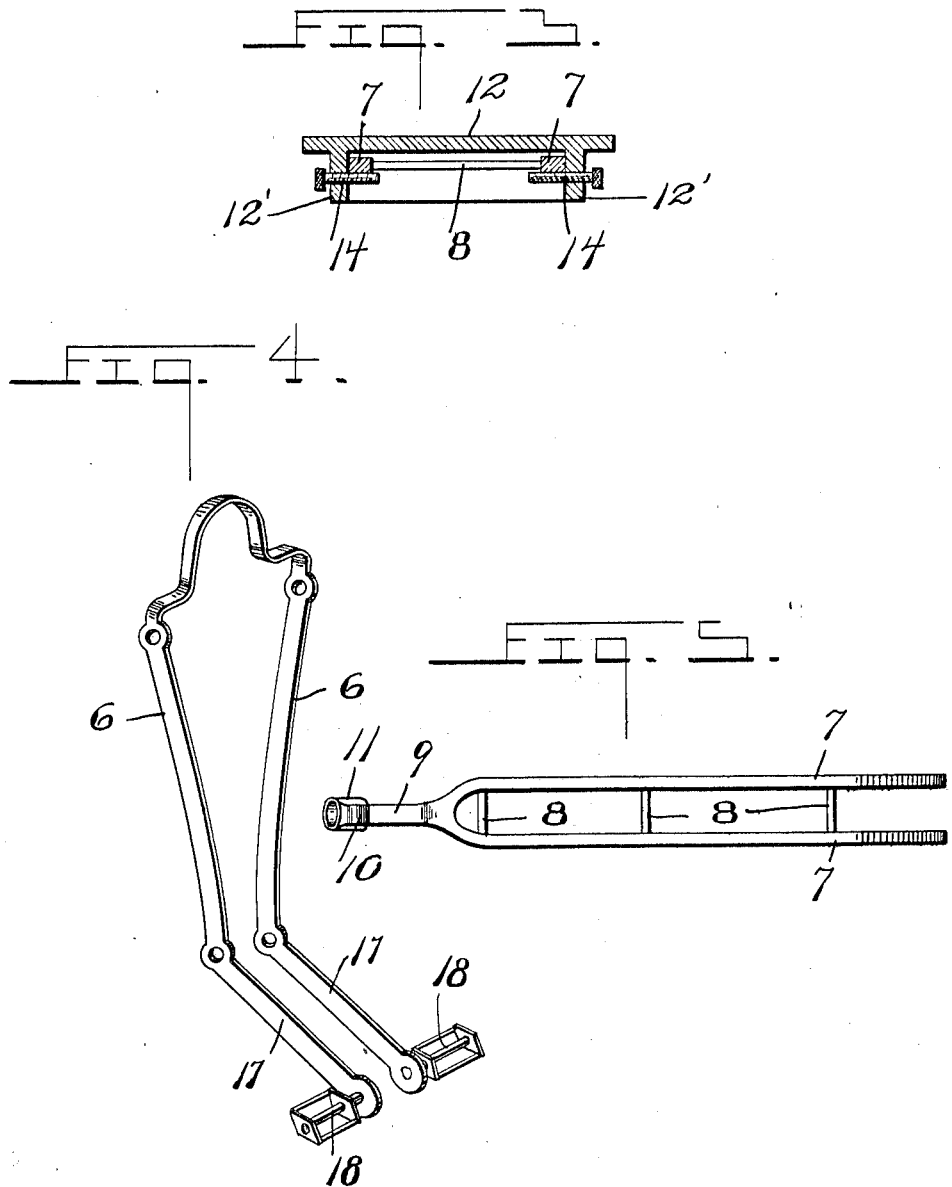

UNITED STATES PATENT OFFICE.

CLARENCE J. EMBREE, OF TACOMA, WASHINGTON.

SEAT AND CARRIER FOR MOTOR-CYCLES.

1,020,486.                     Specification of Letters Patent.       Patented Mar. 19, 1912.

Application filed August 8, 1910. Serial No. 576,123.

*To all whom it may concern:*

Be it known that I, CLARENCE J. EMBREE, a citizen of the United States, residing at Tacoma, in the county of Pierce and State of Washington, have invented certain new and useful Improvements in Seats and Carriers for Motor-Cycles, of which the following is a specification.

This invention relates to certain new and useful improvements in a combined seat and carrier for motor cycles, and more particularly to those that may be resiliently and detachably secured to the rear portion of the machine and located immediately above the rear wheel of said machine.

The object of the invention is to provide a very simple, practical and efficient device of the character described, whereby the seat is resiliently held in a substantially horizontal position, said seat being so constructed as to be readily converted into a carrier for various purposes, the seat proper forming a detachable part of the device.

Briefly stated, the invention consists of a fork shaped support, the lower ends of which are adapted to be removably secured to the opposite ends of the rear or drive shaft of the motor cycle, said support being of a sufficient height to be free from the rear wheel and above the mud guard covering the same, a seat composed of two sections in the form of a saddle the parts of which are detachably connected by suitable binding screws, the upper or saddle portion of the seat being composed of leather or other flexible material such as is commonly employed for such purposes, and a main lower support of suitable length and composed of two parallel arranged bars, the rear ends of which are properly curved to form resilient springs, the free ends of which are attached to the U-shaped support adjacent to its upper curved end, the said springs being properly recurved as clearly shown, the forward ends of the support being united and clamped to the brace leading to and attached to the ordinary seat of the motor cycle.

Other objects and advantages will be apparent, from the specification, as the description proceeds, and with reference to the accompanying drawings, in which is shown a seat made in accordance with my invention.

Figure 1 is a side elevation of the complete invention showing the parts assembled, and attached to a motor cycle, Fig. 2 is a vertical longitudinal section of the seat and parts accompanying the same, Fig. 3 is an enlarged transverse section of the seat with the parts connected, Fig. 4 is a perspective view of the yoke shaped support which is employed in carrying out the invention, Fig. 5 is a plan view of the oppositely arranged parallel springs which are detachably secured to the yoke and the brace rod of the motor cycle.

Referring to the drawings, 1 represents a motor cycle of the ordinary construction and having the usual rear drive wheel 2 and seat 3, rigidly held and supported by suitable braces 4 leading from said seat to the rear drive shaft 5 of the machine.

The device to be hereinafter described in detail is constructed to be readily and conveniently attached to the machine, the parts comprising the device being so constructed as to be readily converted into a carrier by removing the detachable saddle forming the upper part of the device.

Passing over the rear wheel 2 of the motor cycle and above the mud guard thereof is a yoke shaped support 6, the lower ends of which are detachably secured to the drive shaft of the machine, whereby the said support is held in a proper spaced position with respect to the wheel. Extending at an angle from and integral with these lower ends are extensions 17 carrying on their free ends the pedals 18.

The supporting springs 7 for the seat are arranged in a parallel position in respect to one another and are connected along their lengths by transversely positioned rods 8, the forward ends of said springs terminating in a single attaching portion 9, having a U-shaped upwardly projecting resilient portion 10, the lower terminal of which is provided with a clamp 11 adapted for removable attachment to the connecting brace 4, adjacent to the seat 3. The forward end of the seat is thus resiliently attached to the frame of said machine and properly supported thereby. The opposite separated ends of the spring 7 extend a suitable distance in rear of the saddle or seat 12, and are positioned on either side of the wheel 2, of the machine, and are recurved with their free ends movably secured to the yoke shaped support 6 at a suitable distance below the upper curved connecting portion of the support, whereby the seat is resiliently supported for the vibrations of the engine of the machine.

As before stated the saddle 12 is detachably secured to the parallel supporting springs 7, said saddle having oppositely located depending flange portions 12' adapted to embrace the opposite edges of said springs, the said flange portions being provided with binding screws 14 which are adapted for engagement with the supporting springs 7 as clearly shown in the drawings. The saddle 12 is capable of a slight longitudinal movement along the supporting spring 7 and is yieldingly held in its proper position by coil springs 15, which are located in suitable sockets 16 secured to said springs, the opposite ends of said springs being likewise secured in similar sockets 17 forming a part of the saddle, the binding screws 14 passing through the oppositely located flanges 12' of said saddle extending below the supporting spring 7 in order to permit the saddle to slightly move in the direction referred to which movement of the saddle further compensates for the vibrations of the engine when the machine is in operation.

From the foregoing description, it will be readily seen that the saddle 12 can be readily and conveniently detached from the supporting springs 7 and parts accompanying the same by releasing the screws 14 and permitting the free ends of said screws to readily pass from under the supporting springs 7.

It will be apparent that changes in the form, proportion, and minor details of construction may be resorted to without departing from the spirit or sacrificing any of the advantages of this invention.

What is claimed is:

1. An attachment for motorcycles, including a fork secured to the rear axle and spanning the rear wheel, resilient members having one end secured to said fork and the other secured to the motorcycle frame, braces connecting said resilient members, a seat having depending flanges spanning the said resilient members, and means for detachably securing the said seat in position.

2. An attachment for motorcycles, comprising a fork having its ends secured to the rear axle and having its intermediate portion spanning the rear wheel, resilient members each having one end secured to the fork and the other to the frame of the motorcycle, a seat having depending flanges extending downward at the sides of the resilient members, and means for resiliently holding the seat in position to permit of slight longitudinal movement thereof on the resilient members.

3. An attachment for motorcycles, comprising a fork having its ends secured to the rear axle and its intermediate portion spanning the rear wheel, resilient members having one end secured to the fork and the other secured to the motorcycle frame, a seat mounted on said resilient members, said seat having depending socket portions, upstanding sockets carried by the resilient members, and springs having their ends fitting into the sockets of the resilient members and of the seat to resiliently support the seat in position and permit of slight longitudinal movement thereof relative to the resilient supporting members.

4. The combination with a motorcycle, of a fork having its ends secured to the rear axle and its intermediate portion spanning the rear wheel, resilient members having one end secured to the fork and the other secured to the rear portion of the motorcycle frame, said resilient members having integral upstanding socket portions, a seat member mounted upon said resilient members and having side flanges depending over the resilient members, set screws carried by said depending flanges and adapted to be forced under the resilient members to prevent upward movement of the seat, said seat having depending socket members disposed inwardly of the socket members of the resilient supports, and springs having one end fitting into the sockets of the seat and the other end fitting into the sockets of the resilient support to yieldingly resist longitudinal movement of the seat relative to the resilient member.

In testimony whereof I affix my signature, in the presence of two witnesses.

CLARENCE J. EMBREE.

Witnesses:
E. G. CLARKE,
E. K. ALDRICH.

---

Copies of this patent may be obtained for five cents each, by addressing the "Commissioner of Patents, Washington, D. C."